United States Patent
Manhire

(10) Patent No.: US 12,194,835 B2
(45) Date of Patent: Jan. 14, 2025

(54) ACTIVE GRILLE SHUTTER VANES WITH IMPROVED SEALING

(71) Applicant: Magna Exteriors Inc., Concord (CA)

(72) Inventor: Jeffrey B. Manhire, Rochester, MI (US)

(73) Assignee: MAGNA EXTERIORS, INC, Concord (CA)

( * ) Notice: Subject to any disclaimer, the term of this patent is extended or adjusted under 35 U.S.C. 154(b) by 154 days.

(21) Appl. No.: 17/798,260

(22) PCT Filed: Feb. 10, 2021

(86) PCT No.: PCT/US2021/017382
§ 371 (c)(1),
(2) Date: Aug. 8, 2022

(87) PCT Pub. No.: WO2021/163133
PCT Pub. Date: Aug. 19, 2021

(65) Prior Publication Data
US 2023/0071242 A1  Mar. 9, 2023

Related U.S. Application Data

(60) Provisional application No. 62/972,819, filed on Feb. 11, 2020.

(51) Int. Cl.
*B60K 11/08* (2006.01)
*F01P 7/10* (2006.01)

(52) U.S. Cl.
CPC .............. *B60K 11/085* (2013.01); *F01P 7/10* (2013.01); *B60Y 2306/05* (2013.01)

(58) Field of Classification Search
CPC ....... F01P 7/10; B60K 11/085; B60Y 2306/05
See application file for complete search history.

(56) References Cited

U.S. PATENT DOCUMENTS

2012/0118656 A1   5/2012   Roddy et al.

FOREIGN PATENT DOCUMENTS

| DE | 3922742 A  | * 1/1990 | ........... B60K 11/085 |
| DE | 3922742 A1 | 1/1990 | |
| EP | 1974974 A1 | 10/2008 | |

OTHER PUBLICATIONS

Canadian Office Action for Application No. 3167568 mailed Oct. 23, 2023.

* cited by examiner

*Primary Examiner* — Kevin A Lathers
(74) *Attorney, Agent, or Firm* — Warn Partners, P.C.

(57) ABSTRACT

Typical active grille shutter vanes meet the frame at either end, with a small clearance between the parts, to avoid the parts binding together. This invention adds a set of soft flaps, which are molded in a two-shot process, to allow the vanes to seal against the frame while closed but sit free of the frame while open. This clearance is accomplished by adding a stepped wall to the frame component, to create an interference between the vane flaps while turning to the closed position, causing the flaps to be deflected in a gradual manner, so the actuator motor is not taxed with a sudden increase in required torque.

12 Claims, 3 Drawing Sheets

ACTIVE GRILLE SHUTTER VANES WITH IMPROVED SEALING

FIELD OF THE INVENTION

The present invention relates to an active grille shutter vane with improved sealing.

BACKGROUND OF THE INVENTION

Current active grille shutter designs do not provide full blockage against air flow while closed because air leakage around the perimeter of the bank of vanes. Also due to clearance requirements the vanes tend to rattle against the frame in some conditions.

It is an object of this invention to provide an improved vane which interfaces with the surrounding frame such that, when closed, there is very little space around the ends of the vanes thereby improving sealing capability and reducing or eliminating the unwanted rattling noise.

SUMMARY OF THE INVENTION

Typical active grille shutter vanes meet the frame at opposing ends, with a small clearance between the parts, to avoid the parts binding together. This invention adds a set of soft flaps, which are molded in a two-shot process, to allow the vanes to seal against the frame while closed but sit free of the frame while open. This clearance is accomplished by adding a stepped wall to the frame component, to create or increase an interference between the vane flaps while turning to the closed position, causing the flaps to be deflected in a gradual manner, so the actuator motor is not taxed with a sudden increase in required torque. Additionally, since the flaps are molded into both inboard and outboard sides of the vane, they provide a centering function on the vanes, to allow them to stay centered in the middle of the Frame—this reduces or eliminates the potential for rattling.

Further areas of applicability of the present invention will become apparent from the detailed description provided hereinafter. The detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings.

DETAILED DESCRIPTION OF THE PREFERRED EMBODIMENTS

Figure 1:
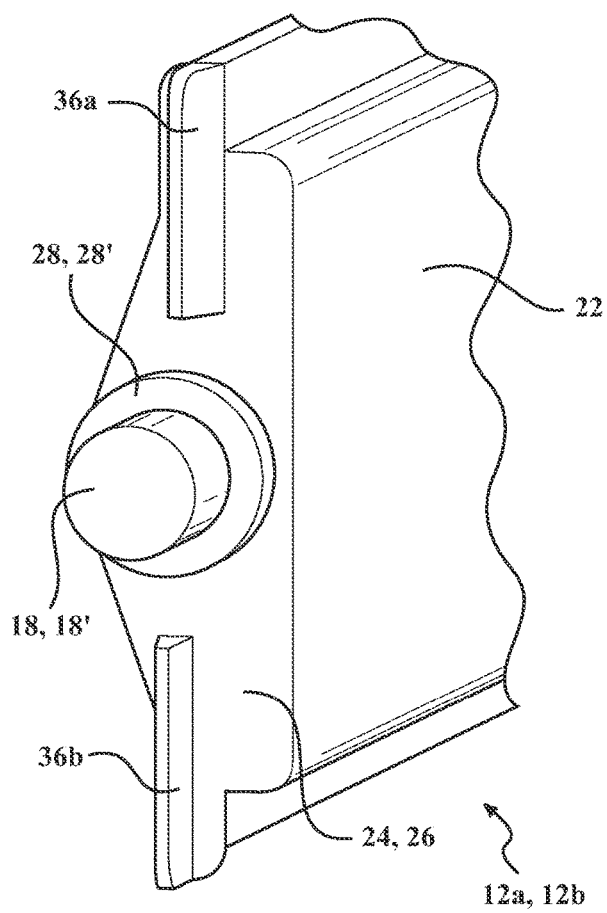
FIG. 1 is an enlarged perspective end view of a vane according to the present invention.

The following description of the preferred embodiment(s) is merely exemplary in nature and is in no way intended to limit the invention, its application, or uses.

Referring now to the figures a vehicle active grille shutter system 10 with at least one vane 12a, 12b is shown and described. The active grille shutter system 10 includes a frame 14 having at least one vane connection side 16. In most applications each vane 12a, 12b has a pivot pin 18, 18' at each end that connects to two different locations of the frame 14. However, it is within the scope of the invention for the vane 12a, 12b to connect to the frame 14 at one end and at the opposite end the vane 12a, 12b connections to a different frame or other vehicle structure used.

The embodiments of the invention depict an active grille shutter system 10 that includes a frame 14 that has a vane connection side at opposing ends of the vane 12 for rotatably connecting the vanes 12a, 12b to the vehicle active grille shutter system 10. Each vane connection side 16 includes a plurality of apertures 20a-20b each for rotatably receiving one of a plurality of pivot pins 18, 18' extending from each vane 12a, 12b.

Referring now to FIG. 1 an enlarged view of an end of each vane 12a, 12b is shown. Each vane 12a, 12b has a body portion 22 with a first end 24 and a second end 26 with a respective one pivot pin 18, 18' extending from the first end 24 or second end 26. Since each end of the vane 12a, 12b is identical, FIG. 1 contains reference numbers representing both the first end 24 and second end 26 of the vane 12a, 12b. However as stated above, some embodiments can have different structures or connection features at opposing ends of the vane, 12a, 12b, therefore the scope of this invention is not limited to having the first end 24 and the second end 26 be identical in all embodiments of the invention.

Each pivot pin 18, 18' connects with one of the plurality of apertures 20a. 20b of one of the plurality of vane connection sides 16. the plurality of vanes 12a, 12b include a raised collar 28, 28' circumscribing each pivot pin 18, 18' that assists in rotatably locating each of the plurality of vanes 12a, 12b when connected to the vane connection side 16 of the frame 14. Each of the plurality of apertures 20a, 20b of on the vane connection side 16 include a cylinder 30a, 30b extending form the surface of the connection side 16 and circumscribing each of the plurality of apertures 20a, 20b. The cylinder 30a, 30b fills in a portion of a gap 32a, 32b between the body 22 of the vane 12a, 12b and the vane connection side 16 when the vanes 12a, 12b are in the closed position. Each cylinder 30a, 30b further includes a flat surface 34a, 34b between the aperture 20a, 20b and the cylinder 30a, 30b.

Each one of the plurality of vanes 12a, 12b includes at least one soft flap 36a, 36b, which as shown are two separate flaps of soft material such as rubber, silicone, vinyl or other suitable material that are connected to the first end 24 and second end 26 of each vane 12a, 12b. While the present embodiment of the invention depicts two soft flaps at each end of the van 12a, 12b, it is within the scope of the invention for a single flap to be used that extends across the entire first end 24 and second end 26 or is located on just one side of the pivot pins 18, 18' depending on the need of a particular application.

Figure 2:
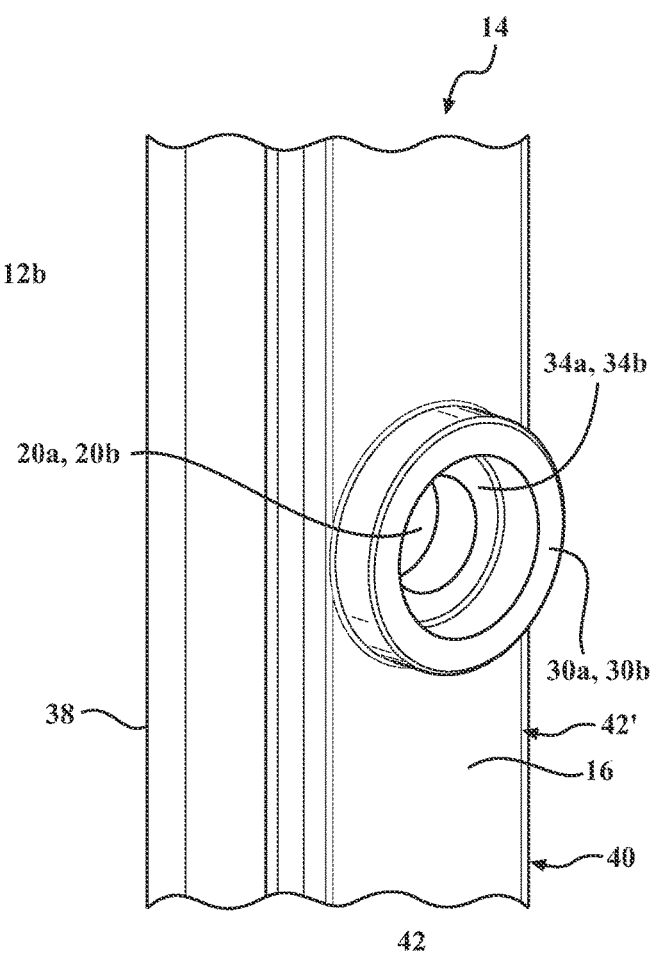
FIG. 2 is an enlarged side perspective view of a vane connection side of a frame according to the present invention.
Figure 4:
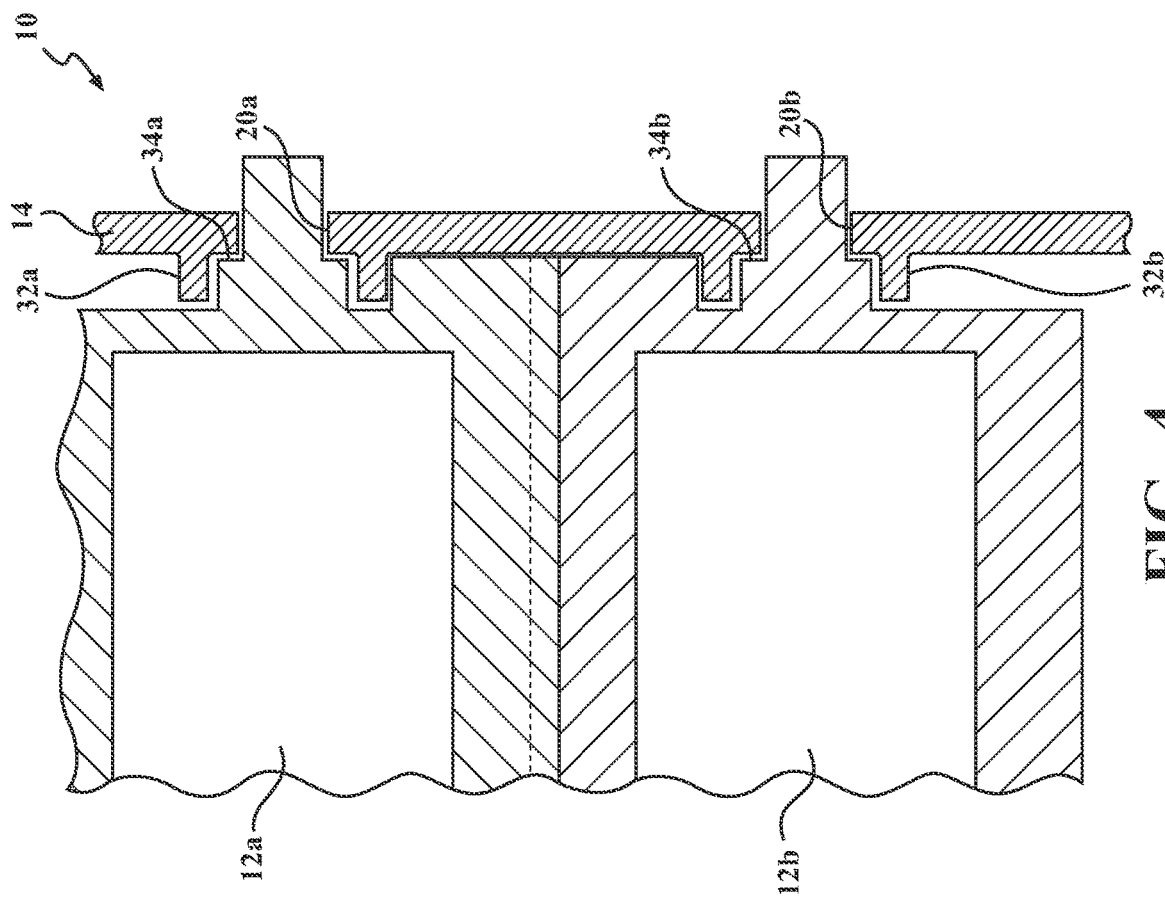
FIG. 4 an enlarged cross-sectional plan side view of two vanes connected with the vane connection.
Figure 3:
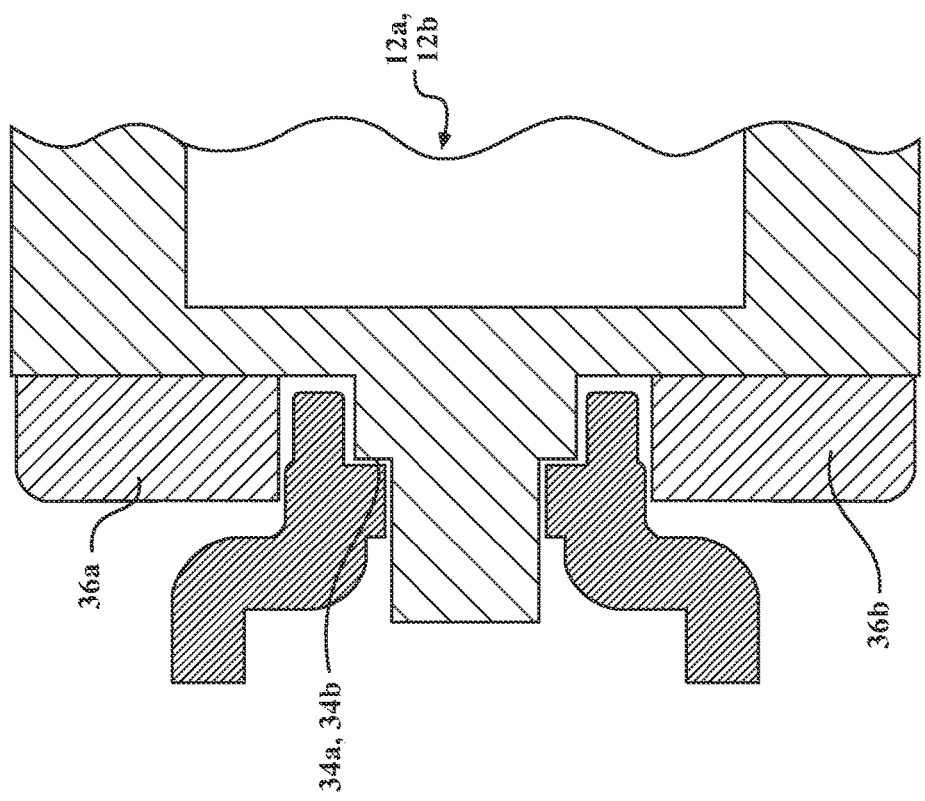
FIG. 3 is an enlarged cross-sectional plan side view of an end of the vane connected with the vane connection.

Each soft flap 36a, 36b of the first end 24 and second end 26 each extend toward the frame 14. When the vanes 12a, 12b rotate to a closed position the soft flap 36a, 36b of the first end 24 and the second end 26 each span the gap 32a, 32b between the body 22 of the vane 12a, 12b and the frame 14. As shown in FIG. 2, the vane connection side 16 has an inboard edge 38 and an outboard edge 40 that define the edge or perimeter of the frame 14 near the vane connection side 16. The inboard edge 38 and outboard edge 40 each have respective angled shoulders 42, 42' that are angled surfaces that transition from the vane connection side 16, which is flat and closer to the body 22 of the vane 12a, 12b to an open area beyond the perimeter of the inboard edge 38 and outboard edge 40. This allows the soft flap 36a, 36b to relax while in the open position, thereby reducing torque load on an actuator of the vehicle active grille shutter system. When the vane 12a, 12b is rotated to the closed position the soft flap 36a, 36b engages the respective inboard edge 38 or outboard edge 40 and is gently bent by the respective angled shoulders 42, 42' which transition the soft flap 36a, 36b from a relaxed state to a bent state that is contact with the vane connection side 16, thereby providing a better seal since the soft flap 36a, 36b is in contact with the vane connection side 16.

Figure 5:
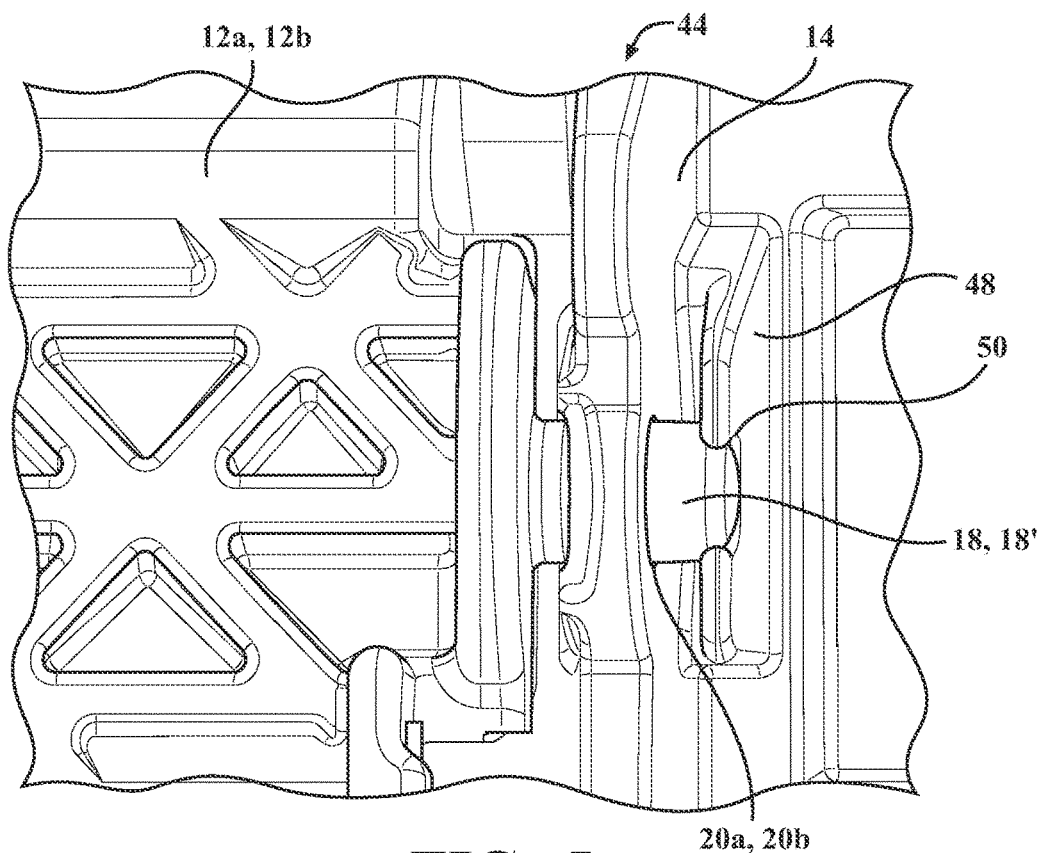
FIG. 5 is an enlarged side plan view of an anti-rattle feature of the invention.
Figure 6:
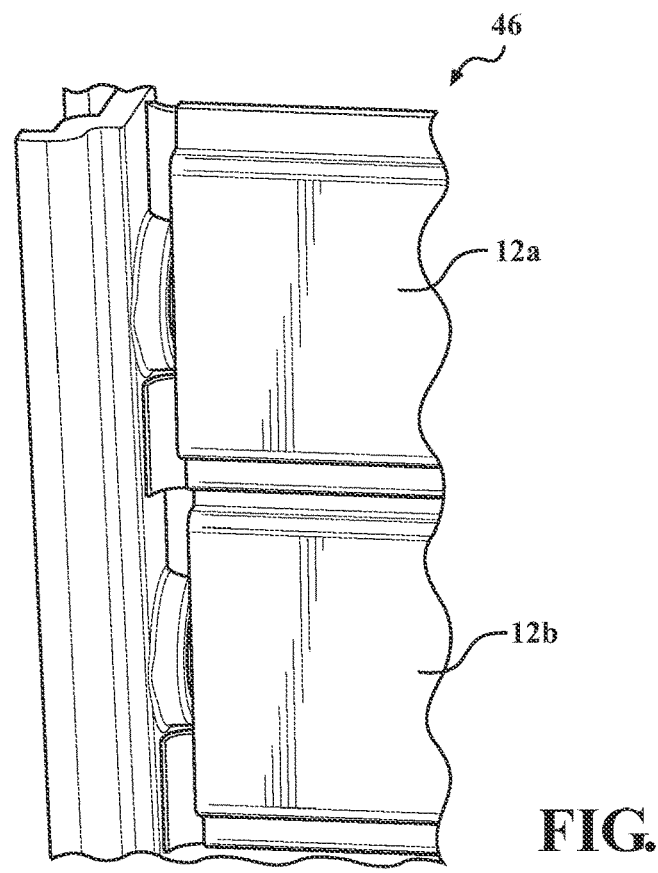
FIG. 6 is an enlarged side perspective view of an anti-rattle features of the invention.

Referring now to FIGS. 5 and 6, a frame anti-rattle feature 44 and a vane anti-rattle feature 46 are shown. The frame anti-rattle feature 44 and vane anti-rattle feature 46 can be used independently or in combination depending on the particular application of the invention. As shown in FIG. 6, the vane anti-rattle feature 46 is provided when each vane 12a, 12b is rotated to the closed position. When the vane 12a, 12b is rotated to the closed position the soft flap 36a, 36b is pressed against the vane connection side 16 of the frame 14 and act as a spring that provide the benefits of anti-rattle and centering of the vane 12a, 12b due to the resiliency of the soft flap 36a, 36b. The clearance of the soft flaps 36a, 36b from the frame when in the open position can be varied so that the soft flaps 36, 36b do not touch, touch or have a slight interference touch with the frame depending on the needs of a particular application.

In addition to the vane anti-rattle feature 46 FIG. 5 shows a frame anti-rattle feature 44. The frame 14 includes a support bridge 48 extending from the surface of the frame 14, adjacent each aperture 20a, 20b. The support bridge 48 has a notch 50 that rotatably grasps the end of the pivot pin 18, 18' of the respective fane 12a, 12b. It is within the scope of the invention for the notch 50 to have a snap fit with the end of the pivot pin 18, 18' and prevents the vane 12a, 12b from moving both axially and laterally, thereby limiting or eliminating unwanted rattle of the vane 12a, 12b with the frame 14.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle active grille shutter system with sealing vane comprising:
    a frame having a vane connection side, the vane connection side having a plurality of apertures for rotatably receiving a pivot pin of one of a plurality of vanes;
    the plurality of vanes each include a body portion with a first end and a second end, a pivot pin extending from the first end for rotatably connecting with one of the plurality of apertures of the vane connection side of the frame;
    each one of the plurality of vanes includes at least one soft flap connected to the first end of each one of the plurality of vanes, wherein the at least one soft flap extends toward and the frame and when a one of the plurality of vanes is rotated to a closed position the at least one soft flap spans a gap between the body portion of the one of the plurality of vanes and the frame, and wherein the vane connection side has an inboard edge and an outboard edge each having angled shoulders that allow the at least one soft flap to relax while in an open position, thereby reducing torque load on an actuator of the vehicle active grille shutter system.

2. The vehicle active grille shutter system with sealing vane of claim 1 further comprising:
    wherein each of the plurality of vanes includes a raised collar circumscribing each pivot pin that assists in rotatably locating each of the plurality of vanes when connected to the vane connection side of the frame.

3. The vehicle active grille shutter system with sealing vane of claim 2 further comprising:
    wherein each of the plurality of apertures on the vane connection side include a cylinder extending from a surface of the vane connection side and circumscribing each of the plurality of apertures, wherein the cylinder fills in a portion of a gap between the body portion of each of the plurality of vanes and the vane connection side when the plurality of vanes are in the closed position.

4. The vehicle active grille shutter system with sealing vane of claim 3 further comprising:
    wherein each cylinder includes a flat surface between a respective one of aperture of the plurality of apertures and the cylinder.

5. The vehicle active grille shutter system with sealing vane of claim 1 further comprising:
    wherein each of the plurality of apertures on the vane connection side include a cylinder extending from a surface of the vane connection side and circumscribing each of the plurality of apertures, wherein the cylinder fills in a portion of a gap between the body portion of each of the plurality of vanes and the vane connection side when the plurality of vanes are in the closed position.

6. The vehicle active grille shutter system with sealing vane of claim 5 further comprising:
    wherein each cylinder includes a flat surface between a respective one of aperture of the plurality of apertures and the cylinder.

7. A vehicle active grille shutter system with sealing vane comprising:
    a frame having a plurality of vane connection sides, the plurality of vane connection sides each have a plurality of apertures for rotatably receiving one of a plurality of pivot pins extending from each one of a plurality of vanes;
    the plurality of vanes each include a body portion with a first end and a second end, a pivot pin extending from the first end for rotatably connecting with one of the plurality of apertures of one of the plurality of vane connection sides of the frame and a pivot pin extending from the second end for rotatably connecting with one of the plurality of apertures of a second one of the plurality of vane connection sides;
    each one of the plurality of vanes includes at least one soft flap connected to the first end of each one of the plurality of vanes and at least one soft flap connected to the second end of each one of the plurality of vanes, wherein the at least one soft flap of the first end and the at least one soft flap of the second end each extend toward the frame and when the one of the plurality of vanes is rotated to a closed position the at least one soft flap of the first end and the at least one soft flap of the second end each span a gap between the body portion of the one of the plurality of vanes and the frame, and wherein the plurality of vane connection sides has an inboard edge and an outboard edge each having angled shoulders that allow the at least one soft flap to relax while in an open position, thereby reducing torque load on an actuator of the vehicle active grille shutter system.

8. The vehicle active grille shutter system with sealing vane of claim 7 further comprising:
wherein each of the plurality of vanes at opposing ends each include a raised collar circumscribing each pivot pin that assists in rotatably locating each of the opposing ends of the plurality of vanes when connected to a one of the vane connection sides of the frame.

9. The vehicle active grille shutter system with sealing vane of claim 8 further comprising:
wherein each of the plurality of apertures of the vane connection sides include a cylinder extending from a surface of the vane connection sides that circumscribes the plurality of apertures, wherein the cylinder fills in a portion of a gap between the body portion of a respective one of the plurality of vanes and a respective one of the vane connection sides when the plurality of vanes are in the closed position.

10. The vehicle active grille shutter system with sealing vane of claim 9 further comprising:
wherein each cylinder includes a flat surface between a respective one aperture of the plurality of apertures and the cylinder.

11. The vehicle active grille shutter system with sealing vane of claim 7 further comprising:
wherein each of the plurality of apertures of the vane connection sides include a cylinder extending from a surface of the vane connection sides that circumscribes the plurality of apertures, wherein the cylinder fills in a portion of a gap between the body portion of a respective one of the plurality of vanes and a respective one of the vane connection sides when the plurality of vanes are in the closed position.

12. The vehicle active grille shutter system with sealing vane of claim 11 further comprising:
wherein each cylinder includes a flat surface between a respective one aperture of the plurality of apertures and the cylinder.

* * * * *